Feb. 28, 1933.   J. BERG   1,899,006
BUCKET
Filed July 20, 1929
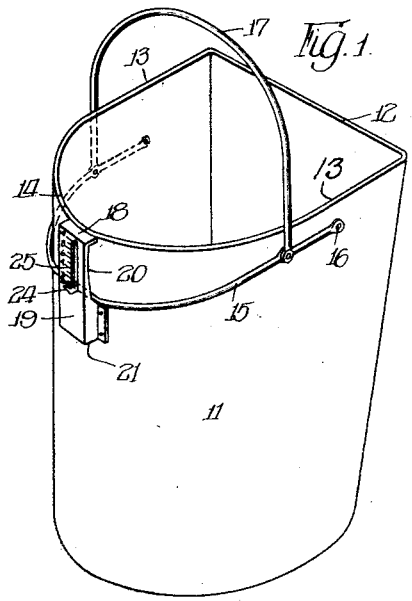
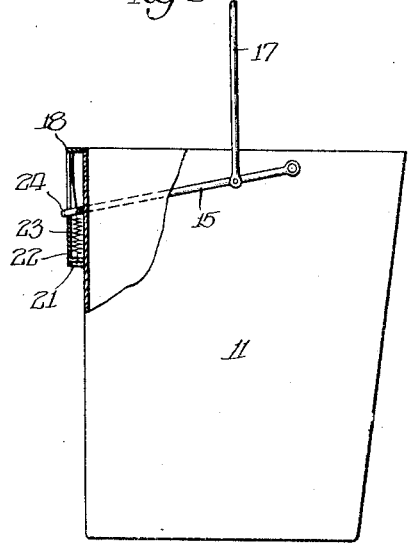
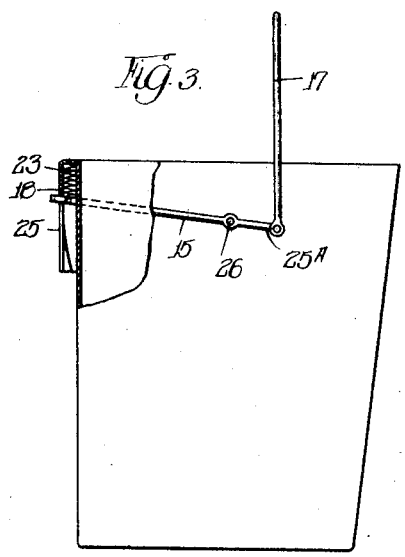
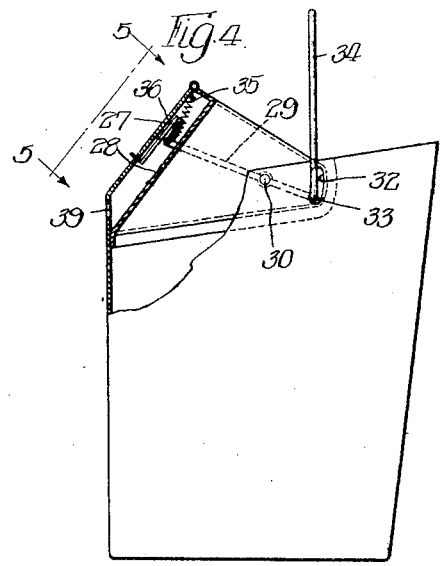
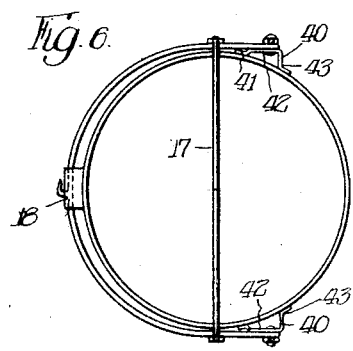
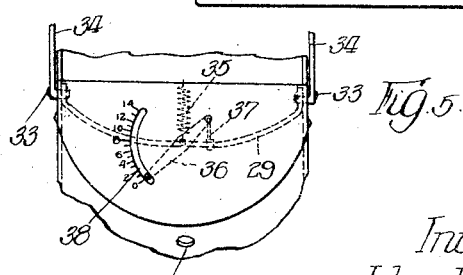
Inventor:
John Berg,
By Cromwell, Greist & Warden
Attys.

Patented Feb. 28, 1933

1,899,006

UNITED STATES PATENT OFFICE

JOHN BERG, OF CECIL, WISCONSIN

BUCKET

Application filed July 20, 1929. Serial No. 379,642.

The primary object of the present invention is the provision of means associated with a bucket or pail to provide a quick and easy method of weighing the contents thereof.

A further object of the invention is the provision of an improved form of bucket which renders the scooping of grain or other materials more effectively and easily done.

The invention is particularly useful in connection with the feeding of stock, such as dairy cattle. It has been found that for most efficient operation of a stock farm that the cattle and other animals receive individual feedings of a predetermined quantity of food depending upon the characteristic of each animal. This is particularly true of dairy cows. It has also been found that for efficient operation it is necessary to weigh the milk received from each cow at each milking.

Under the present feeding methods in which a bucket or pail is usually employed, it is necessary to weigh the amount of food on a scale separate and apart from the bucket. This procedure is slow and often disregarded in the haste of performing chores.

The present invention is designed to facilitate accurate feeding as well as for various other uses where it is desirable to fill a bucket or pail with a predetermined weight of material.

In order that the invention may be better understood, preferred forms thereof are illustrated in the accompanying drawing and described in the specification. It is to be understood, however, that this disclosure is given for purposes of exemplification only and is not to be construed as unnecessarily limiting the scope of the protection sought and defined in the appended claims, as it will be obvious to anyone skilled in the art upon understanding the principles of the invention that details of construction may be varied without departing from the true spirit and scope of the invention.

In the drawing:

Fig. 1 illustrates a bucket constructed in accordance with the invention, one side thereof being squared;

Fig. 2 is a view in side elevation of the device shown in Fig. 1 with a portion broken away showing details of construction;

Fig. 3 is a modified form of the invention;

Fig. 4 is a further modification of the invention showing the indicator for the scale mounted in angular relationship to the rim of the bucket;

The general shape of the bucket shown in Figs. 3 and 4 is the same as that shown in Figs. 1 and 2;

Fig. 5 is a view in elevation taken at the angle indicated on the line 5—5 of Fig. 4, and Fig. 6 is a further modified form of the invention showing the same as applied to the ordinary round type of pail.

Referring to Figs. 1 and 2 of the drawing, it will be seen that the same disclose a bucket 11 having one side 12 flat and two sides thereof 13 parallel and the other side 14 curved. A weighing beam 15 is pivotally secured to the side walls 13 of the bucket near the top thereof by means of pins 16. The beam member 15 extends around the curved side 14 of the bucket and is free to move at its medial portion along that side. Pivotally secured to the beam member 15 is a bail 17. The bail 17 is secured to the beam member 15 at a point such that when the bucket is filled it will ride evenly and will not be tipped to one side when the bucket is lifted by the bail.

The weighing mechanism 18 is associated with the beam member 15 in such manner that when the bucket is lifted by the bail 17 the weighing mechanism will indicate the weight of the contents of the bucket. The weighing mechanism 18 comprises a housing 19 which is fixedly secured to the side of the bucket and is provided with elongated arcuate shaped slots 20 in the side walls thereof through which the beam member 15 passes and is permitted to move up and down along the edge of the bucket. The bottom 21 of the housing is open for reasons which will be hereinafter pointed out. Passing through the housing 19 near the bottom thereof and below the beam 15 is a pin 22 to which one end of a coiled spring 23 is connected. The other end of the coiled spring 23 is connected to the beam member 15. Attached to the beam 15 is an indicating arm 24 which passes through a slot 25 in the housing 19. The slot 25 is graduated so that the weight of the contents of the bucket can be determined by the position of the indicating arm 24 in the slot 25.

The operation of the device shown in Figs. 1 and 2 is as follows:

The bucket is filled with material in the usual way, it is then lifted by the bail 17, which being pivotally connected to the beam 15 causes the beam 15 to rotate on the pin 16 and stress to be put on the spring 23, thus expanding the spring. As the beam 15 rises, the pointer 24 indicates the weight of the contents of the bucket as appears from the graduations on the housing 19. The slots 20 in the housing 19 being curved or arcuate in shape, arcuate movement of the beam 15 is permitted.

The spring 23 may be so adjusted and put under tension such that the weight of the bucket will not cause the same to further expand with the result that the net content of the bucket will be indicated on the scale. By limiting the movement of the beam 15 in the housing 19 so that it cannot extend beyond the elastic limits of the spring 23 an accurate and serviceable device is obtained.

It has been found necessary to so construct the device that grain and similar articles will not become lodged in the weighing mechanism, or if lodged there, can easily be removed. To accomplish this end, the bottom of the housing 19 is open so that any particles which might pass into the weighing mechanism through the slots 20 and 25 will drop out the bottom of the housing, or should any foreign matter become lodged in the weighing mechanism, it can be easily removed through the opening at the bottom of the housing.

In the construction of devices of this type it has been found advantageous to have one side of the pail flat or square and the side walls to which the weighing beam 15 is connected parallel. The advantages of flattening one side are that by so doing it permits easier operation of the bucket in scooping grain from a bin as the flat side will ride along the side walls and bottom of the bin. A further advantage of flattening one side of the bucket is that it permits the side walls to be straight and parallel, a feature of importance in the construction of the device since the beam 15 is pivoted at a point off center of the bucket. By constructing these walls so that they are parallel, the possibility of the beam 15 binding on the side walls of the bucket is reduced to a minimum and simpler and more efficient construction results.

The curved side wall 14 of the bucket may be constructed along an arc having the same radius as the radius of the bottom of the bucket, thus insuring that there will be no flare at the side wall such as would interfere with and bind the beam member 15 as it moves up and down.

Referring to the modified construction shown in Fig. 3 of the drawing, it will be seen that the construction contemplates that the bail 17 is pivotally mounted on the ends 25ᴬ of the beam 15 and the beam 15 is pivoted to the side walls of the bucket between the point of connection of the bail 17 and the weighing mechanism 18 at the point 26.

The action of the weighing mechanism is therefore reversed and the spring 23 is connected to the top of the housing 19, the graduation along the slot 25 is reversed and when the bucket is lifted by the bail 17 the beam 15 is rotated about the pin 26, exerting a downward pressure on the spring 23, causing the same to expand.

In the device shown in Figs. 1 and 2 the beam 15 acts as a lever of the third class, whereas in the construction illustrated in Fig. 3 the beam 15 acts as a lever of the first class.

The device shown in Figs. 4 and 5 is a modified structure in which the weighing mechanism is indicated on a beveled face extending upwardly and inwardly from the upper periphery of the bucket. It is necessary in a structure of this sort that a housing be provided inclosing the weighing beam so that the contents of the bucket will not interfere with the movement thereof. As shown in the drawing, the beveled portion 27 has spaced from the inner side thereof a housing member 28 which extends around the inner side of the bucket to completely cover the beam member 29 and the weighing mechanism.

The beam member 29 pivotally mounted at the point 30 floats in the housing 28 and conforms to the shape thereof. Arcuate slots 32 are provided in each side of the pail and the ends 33 of the bail member 34 extend through the slots. The bail member 34 is pivotally mounted to the ends 33 of the beam 29. The housing 28 completely envelops the beam 29 and the weighing mechanism, thus the inside of the bucket has a smooth surface which is easily cleaned.

The weighing mechanism comprises a spring 35, one end of which is secured at the top edge of the beveled face 27 and the other end to the beam 29. An indicating arm 36 is pivotally mounted at its medial portion to the inner side of the beveled face 27 and one end thereof is secured to the bail 29 by means of the link 37. The other end of the indicator 36 extends through an arcuate shaped slot 38 provided in the beveled face 27. As shown in the drawing, the graduations are along the slot 38.

In order that any form of material which may pass through the slot 38 into the weighing mechanism may be removed therefrom, an opening 39 is provided near the lower edge of the beveled face 27.

In Fig. 6 is shown a modified structure in which the upper edge of the pail is circular in shape. The beam 15 and the weighing mechanism 18 is identical with that shown in Figs. 1 and 2, as is also the mounting of the bail 17.

The mounting of the beam 15 to the bucket, however, is different from that shown in Figs. 1 and 2 in that a pair of brackets 40 are provided to which the ends of the beam are pivotally mounted. The brackets 40 are constructed with a short arm 41 which is attached near the center of the upper edge of the pail and from which projects a portion 42 on a line parallel with the axis of the pail passing through the weighing mechanism. A long leg 43 integral with the end of the member 42 and holding the same in position is secured to the periphery of the pail.

By means of the brackets 40 the ends of the beam member are permitted to extend beyond the middle of the pail and thereby permit mounting of the bail in such fashion as to balance the pail, as by using such brackets it is only necessary that the beam describe a semi-circle with the result that the same is permitted to move freely and will not bind against the wall of the pail.

The device has been found to be useful for the purposes herein set forth, as well as for other uses, is simple in construction and can be economically manufactured.

I claim:

1. The combination with a bucket, of means for weighing the contents of said bucket, said weighing means comprising a housing, a balance beam pivotally associated with the side walls of the bucket and passing through said housing, a resilient member connecting said balance beam with said housing, means actuated by said balance beam for indicating the weight of the contents of the bucket, and a bail member secured to said balance beam for carrying the bucket.

2. The combination with a bucket having a straight edge at the top of one side wall thereof and having two straight parallel side walls projecting from the first mentioned side wall, the remainder of the wall portion of the bucket being arcuate-shaped, of a balance beam pivotally secured to said straight side walls and passing around said arcuate-shaped wall, a housing member positioned on said arcuate-shaped wall, a resilient member positioned within said housing member and having one end thereof secured to said housing member and the other end to said balance beam, and a bail member attached to said balance beam for carrying the bucket.

3. The combination with a bucket, of a housing member secured to one side thereof, a balance beam pivotally secured to said bucket and passing through said housing member, weighing mechanism within said housing member connected to said balance beam, and a bail member secured to said balance beam, said housing member being provided with an opening to permit the removal of foreign matter therefrom.

4. The combination with a bucket of a balance beam pivotally connected to said bucket, a weighing mechanism affixed to said bucket and operatively connected to said balance beam, a bail member connected to said balance beam in such relation to said bucket that the latter will ride evenly when filled and carried by said bail member.

5. The combination with a bucket of a member pivoted to said bucket and passing around a portion of the perimeter thereof, a weighing mechanism connected to said bucket and said member, and a bail member pivotally connected to the first mentioned member.

6. The combination with a bucket of a single weighing mechanism fastened to the body of said bucket, a balance beam member passing around a portion of the side wall of said bucket which is pivotally connected thereto and operatively connected to said weighing mechanism, and a bail member connected to the balance beam member.

In testimony whereof I have hereunto subscribed my name.

JOHN BERG.